(12) United States Patent
Utermoehlen et al.

(10) Patent No.: US 10,955,262 B2
(45) Date of Patent: Mar. 23, 2021

(54) ROTATION ANGLE SENSOR FOR A STATOR

(71) Applicant: Robert Bosch GmbH, Stuttgart (DE)

(72) Inventors: Fabian Utermoehlen, Lippstadt (DE); Stefan Leidich, Rutesheim (DE); Ralf Kieser, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/331,694

(22) PCT Filed: Aug. 16, 2017

(86) PCT No.: PCT/EP2017/070710
§ 371 (c)(1),
(2) Date: Mar. 8, 2019

(87) PCT Pub. No.: WO2018/046256
PCT Pub. Date: Mar. 15, 2018

(65) Prior Publication Data
US 2019/0242726 A1 Aug. 8, 2019

(30) Foreign Application Priority Data
Sep. 9, 2016 (DE) ...................... 10 2016 217 255.7

(51) Int. Cl.
*G01D 5/20* (2006.01)
(52) U.S. Cl.
CPC ................... *G01D 5/2053* (2013.01)
(58) Field of Classification Search
CPC ..... G01D 5/2053; G01D 5/204; G01D 5/2046
See application file for complete search history.

(56) References Cited

U.S. PATENT DOCUMENTS

| 4,829,250 A | * | 5/1989 | Rotier | ..................... F41G 3/225 |
| | | | | 324/207.17 |
| 2008/0116883 A1 | | 5/2008 | Ruehl | |
| 2018/0224301 A1 | * | 8/2018 | Herrmann | .............. G01D 5/204 |

FOREIGN PATENT DOCUMENTS

| DE | 199 20 190 A1 | 11/2000 |
| DE | 100 26 019 A1 | 11/2001 |

(Continued)

OTHER PUBLICATIONS

International Search Report corresponding to PCT Application No. PCT/EP2017/070710, dated Dec. 22, 2017 (German and English language document) (7 pages).

*Primary Examiner* — Jay Patidar
(74) *Attorney, Agent, or Firm* — Maginot, Moore & Beck LLP

(57) ABSTRACT

A rotary sensor includes a stator element and a rotor element that is rotatably mounted in respect of the stator element about an axis of rotation. A rotary angle can be captured by inductive coupling between the rotor element and the stator element. The rotary sensor further includes a measuring device configured to capture the rotary angle depending on the inductive coupling between the rotor element and the stator element. The stator element has at least one transmission coil for emitting alternating electromagnetic fields and at least two reception coils for capturing alternating electromagnetic fields, when the measuring device is configured to excite the at least one transmission coil with at least two mutually different frequencies for emitting at least two alternating electromagnetic fields.

9 Claims, 7 Drawing Sheets

(56) References Cited

FOREIGN PATENT DOCUMENTS

| DE | 101 21 870 A1 | 11/2002 |
| DE | 600 38 420 T2 | 4/2009 |
| DE | 10 2013 222 024 A1 | 5/2014 |
| DE | 10 2013 225 921 A1 | 7/2015 |
| EP | 0 909 955 A2 | 4/1999 |
| EP | 2 884 236 A1 | 6/2015 |

* cited by examiner

ROTATION ANGLE SENSOR FOR A STATOR

This application is a 35 U.S.C. § 371 National Stage Application of PCT/EP2017/070710, filed on Aug. 16, 2017, which claims the benefit of priority to Serial No. DE 10 2016 217 255.7, filed on Sep. 9, 2016 in Germany, the disclosures of which are incorporated herein by reference in their entirety.

BACKGROUND

The disclosure relates to a rotation angle sensor and a stator element therefor.

By arranging transmission and reception coils on the stator of a rotation angle sensor, which coils are inductively coupled to a target on the rotor such that, when an electromagnetic alternating field is emitted by the transmission coil, at least two different AC voltages are induced in at least two reception coils, the rotation angle is able to be detected depending on the induced AC voltages.

This is described for example in EP 0 909 955 B1.

SUMMARY

In real sensors, measurement errors may occur that are caused by external interference. Such interference may be for example interfering signals that influence the electromagnetic alternating field in the reception coil. Other interference may arise due to installation tolerances, for example due to tilting of the target in relation to an axis of rotation of the rotation angle sensor. If such a sensor is exposed to an external electromagnetic alternating field as an interfering signal at a frequency similar to the operating frequency, in particular in the range of +/−100 kHz around its operating frequency, these alternating fields overlap. A voltage induced in the reception coil by overlapping of the alternating field is in some circumstances then not able to be distinguished from a voltage induced without an interfering signal. This may impair measurement accuracy, for example.

There may therefore be a need to provide a rotation angle sensor that is robust against such measurement errors.

The object of the disclosure is therefore to provide an improved rotation angle sensor.

This object is achieved by the rotation angle sensor and the stator element disclosed herein.

Further advantageous refinements of the disclosure are specified in the dependent claims.

A corresponding rotation angle sensor comprises a stator element, a rotor element mounted so as to be able to rotate about an axis of rotation with respect to the stator element, and a measurement device. The rotation angle is able to be detected through inductive coupling between the rotor element and the stator element. The measurement device is designed to detect the rotation angle depending on the inductive coupling between the rotor element and the stator element. The stator element has at least one transmission coil for emitting electromagnetic alternating fields and at least two reception coils for detecting electromagnetic alternating fields. The measurement device is designed to excite the at least one transmission coil at at least two different frequencies in order to emit at least two electromagnetic alternating fields. The measurement device is designed to demodulate at least two AC voltages induced in at least one of the at least two reception coils by emitting the at least two electromagnetic alternating fields in order to detect at least two inductive couplings by way of respective frequencies of the at least two electromagnetic alternating fields.

The rotor element may have at least one electrically conductive section. Such an electrically conductive section may be inductively coupled to the respective reception coil, for example, such that, when the at least one electromagnetic alternating field is emitted by the at least one transmission coil, at least one AC voltage is induced in the respective reception coil.

The at least one electrically conductive section may be arranged on the rotor element, for example, such that the at least one AC voltage induced in the respective reception coil in particular predominantly depends on a rotation angle between the stator element and the rotor element.

The at least one angle-detecting transmission coil has applied to it for example an AC voltage that has amplitudes in the range of 0.5 V to 10 V, preferably 1.5 V, at frequencies in the range of a few MHz, preferably between 4 MHz and 6 MHz.

The measurement device advantageously comprises a frequency generator, in particular a digital frequency generator, that is designed to predefine a multiplicity of in particular constantly changing frequencies for the emission of electromagnetic alternating fields of different frequency by the at least one transmission coil. The measurement device comprises a demodulator that is designed to demodulate the AC voltages, induced by way of the electromagnetic alternating fields of different frequency, by way of the respectively predefined frequency.

In this connection, a multiplicity means at least two frequencies, preferably at least three frequencies, which are able to be predefined by the frequency generator.

Frequency generators, in particular digital frequency generators, make it possible to predefine a multiplicity of different frequencies in a particularly easily manageable manner. By way of example, frequencies are predefined in a frequency band of a few kHz, for example in a frequency band with a width of 500 kHz or 400 kHz, in the range of frequencies from 4 MHz to 6 MHz. After predefining the frequency, the electromagnetic alternating field is emitted at this frequency. In the meantime, the inductive coupling is detected on the basis of the AC voltage induced in the at least one of the at least two reception coils. These steps are then repeated. The frequency change may be predefined in line with an increasing or decreasing ramp or an increasing or decreasing step. As an alternative, it may also be performed randomly.

In this connection, constant means that no jumps or only small jumps are present between two predefined frequencies. By way of example, frequencies are predefined at an interval of 50 kHz. Signal jumps and thus transient oscillations, which could make the measurement inaccurate, are thus avoided.

The stator element preferably has a first transmission coil, a second transmission coil, and at least two reception coils. The first transmission coil emits a first electromagnetic alternating field. The second transmission coil emits a second electromagnetic alternating field whose frequency differs from the first electromagnetic alternating field, in particular by at least 5%.

By virtue of two transmission coils that emit two different electromagnetic alternating fields, electromagnetic alternating fields at two different frequencies are able to be used to measure the rotation angle. An interfering signal at a frequency that comes close to the frequency of one of the electromagnetic alternating fields is therefore only able to have an influence that interferes with the measurement on one of the electromagnetic alternating fields. If more than two frequencies are predefined, an erroneous voltage is able to be recognized on the basis of a deviation from the other two voltages. This reduces the susceptibility of the rotation angle sensor to interference in relation to an interfering signal at a frequency that comes close to the frequency of one of the electromagnetic alternating fields.

The measurement device preferably comprises a first resonant oscillating circuit that is designed to generate the first electromagnetic alternating field at a first frequency at a first time. The measurement device comprises a second resonant oscillating circuit that is designed to generate the second electromagnetic alternating field at a second frequency at a second time different from the first time.

The electromagnetic alternating fields are able to be generated easily by way of resonant oscillating circuits. This constitutes an inexpensive, space-saving alternative to more complex circuits for predefined frequencies that do not change.

The rotation angle sensor advantageously comprises a demodulator that is designed to demodulate the first induced AC voltage generated in the respective reception coil by way of the first frequency and to demodulate the second induced AC voltage generated in the respective reception coil by way of the second frequency. This constitutes an inexpensive, space-saving alternative to more complex circuits for predefined frequencies that do not change.

The stator element advantageously has at least two first reception coils and at least two second reception coils. The at least two first reception coils are designed to detect a first induced AC voltage at the first frequency of the first electromagnetic alternating field, and the at least two second reception coils are designed to detect a second induced AC voltage at the second frequency of the second electromagnetic alternating field. In this connection, designed means that the respective coil is optimized for the respective reception frequency. In addition to the actual desired inductance, real coils also have other, generally unwanted electrical properties, such as an electrical resistance, stray capacitances and therefore a resonant circuit having at least one electrical resonance point (natural resonance). By way of example, a suitable coil has a natural resonance of at least four times the reception frequency. This avoids unwanted effects caused by natural resonance.

The measurement device advantageously comprises a first resonant oscillating circuit that is designed to generate the first electromagnetic alternating field at a first frequency at a first time, and wherein the measurement device comprises a second resonant oscillating circuit that is designed to generate the second electromagnetic alternating field at a second frequency at a second time different from the first time.

The electromagnetic alternating fields are able to be generated easily by way of resonant oscillating circuits. This constitutes an inexpensive, space-saving alternative to more complex circuits for predefined frequencies that do not change.

The measurement device advantageously comprises a demodulator that is designed to demodulate the first induced AC voltage by way of the first frequency and to demodulate the second induced AC voltage by way of the second frequency. This constitutes an inexpensive, space-saving alternative to more complex circuits for predefined frequencies that do not change.

The demodulator is advantageously designed to demodulate the first induced AC voltage as input signal of at least one of the at least two first reception coils at the first frequency and to demodulate the second induced AC voltage as input signal of at least one of the at least two second reception coils at the second frequency.

As a result, the signal paths for the measurement are separated. Such a redundant system may also be used to monitor or recognize errors in the sensor.

The rotation angle sensor advantageously comprises at least one resonant oscillating circuit for generating a respective frequency, wherein the at least one resonant oscillating circuit comprises the at least one transmission coil, in particular as part of at least one LC resonant circuit. This constitutes a space-saving alternative to more complex circuits.

The resonant oscillating circuit advantageously comprises at least one varactor that is connected in parallel with the at least one transmission coil, wherein a respective frequency is able to be tuned by the varactor. The varactor is an electronic semiconductor component. By changing a voltage applied to the varactor, it is possible to vary the capacitance of the varactor.

An electrically controllable capacitance is thus made available by way of which the resonant oscillating circuit is easily able to be tuned through electrical control.

A multiplicity of frequencies are advantageously in particular able to be predefined in the range of 4 MHz to 6 MHz.

The disclosure also relates to a stator element of the described type for a rotation angle sensor.

BRIEF DESCRIPTION OF THE DRAWINGS

Preferred embodiments of the disclosure are explained in more detail below with reference to the attached drawings, in which.

DETAILED DESCRIPTION

Figure 1:
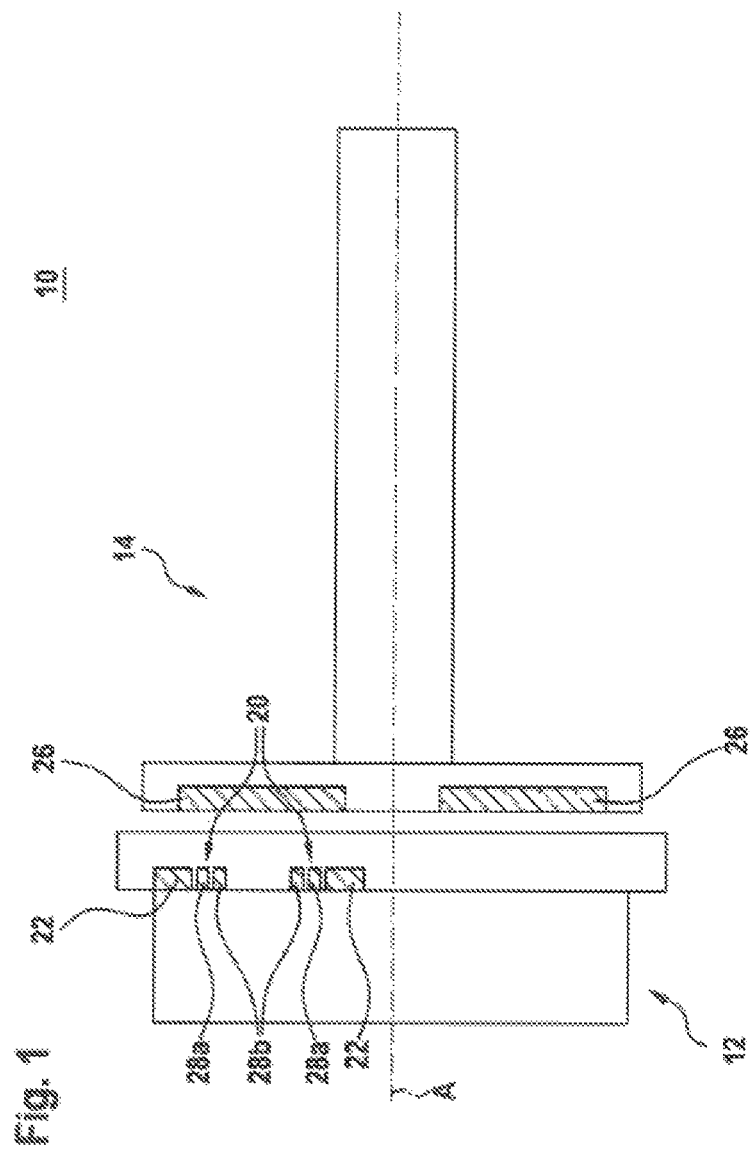
FIG. 1 schematically shows a view of part of a rotation angle sensor according to a first embodiment, in a side view, FIG. 2 schematically shows a view of part of the rotation angle sensor according to the first embodiment, in a plan view, FIG. 3 schematically shows a view of part of the rotation angle sensor and part of a measurement device according to the first embodiment, FIG. 4 schematically shows a view of part of a rotation angle sensor according to a second embodiment, in a side view, FIG. 5 schematically shows a view of part of the rotation angle sensor and part of a measurement device according to the second embodiment, FIG. 6 schematically shows a view of part of a rotation angle sensor according to a third embodiment, in a side view, FIG. 7 schematically shows a view of part of the rotation angle sensor and part of a measurement device according to the third embodiment, FIG. 8 schematically shows a view of part of a resonant oscillating circuit.

FIG. 1 schematically shows a view of part of a rotation angle sensor 10 according to a first embodiment, in a side view. The rotation angle sensor 10 comprises a stator element 12 and a rotor element 14 mounted so as to be able to rotate about an axis of rotation A with respect to the stator element 12.

The rotation angle is able to be detected through inductive coupling between the rotor element 14 and the stator element 12. Details on the inductive coupling and the use thereof to determine the rotation angle are described for example in EP 0 909 955 B1.

The stator element 12 accordingly has for example the at least one transmission coil 22, illustrated in FIG. 1, for emitting an electromagnetic alternating field, and at least two reception coils 28a, 28b for detecting electromagnetic alternating fields. The two reception coils 28a, 28b are arranged in a plane perpendicular to the axis of rotation A, in the radial direction with respect to the axis of rotation A, for example in the same plane of the circuit board, in the example. The transmission coil 22 is arranged outside the respective reception coils 28a, 28b as seen in the radial direction with respect to the axis of rotation A.

"Radial" or "radial arrangement" hereinafter means a spoke-shaped direction or arrangement starting from the axis of rotation A. "Circumferential" or "circumferential direction" hereinafter means a circular direction substantially in a plane perpendicular to the axis of rotation A. "Axial direction" hereinafter means a direction along the axis of rotation A.

A sensor circuit board for the rotation angle sensor 10 comprises for example at least one circumferentially arranged transmission coil 22 that has one or more windings and is preferably configured as a planar coil. The windings may advantageously be produced in a plurality of planes of a multilayer circuit board so as to be able to generate a sufficiently large electromagnetic alternating field and a sufficiently large inductance. The at least one transmission coil 22 has applied to it an AC voltage that has amplitudes in the range of 0.5 V to 10 V, preferably 1.5 V, at frequencies in the range of a few MHz.

The rotor element 14 has at least one electrically conductive section 26. The at least one electrically conductive section 26 is inductively coupled to the at least two reception coils 28a, 28b such that, when the electromagnetic alternating field is emitted by the at least one transmission coil 22, at least two AC voltages are induced in the at least two reception coils 28a, 28b.

The at least one electrically conductive section 26 is arranged on the rotor element 14 such that the two first AC voltages induced in the at least two reception coils 28a, 28b in particular predominantly depends on a rotation angle between the stator element 12 and the rotor element 14.

Details on the arrangement of the at least one transmission coil 22, of the at least two reception coils 28a, 28b and of the at least one electrically conductive section 26, and details on determining the rotation angle, are known for example from EP 0 909 955 B1.

Figure 2:
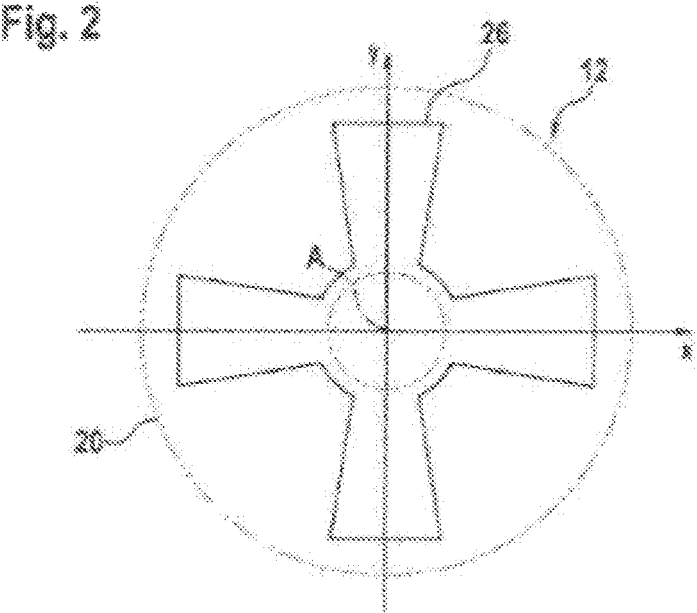

FIG. 2 schematically shows a view of part of the rotation angle sensor according to the first embodiment, in a plan view.

A coil arrangement 20 comprising the at least two reception coils 28a, 28b and the at least one transmission coil 22 is illustrated schematically as a circle in FIG. 2. In the example of FIG. 2, an electrically conductive section 26 is provided that substantially has the shape of the outer border of a Maltese cross in a plane perpendicular to the axis of rotation A, and whose center point lies on the axis of rotation A. The electrically conductive section 26 is preferably an electrically conductive punched sheet-metal part. The shape that is described is an example, and shapes other than the described cross shape are also possible.

The electrically conductive section 26 may be arranged along only the outer border of the shape, or partly or completely fill the area of the shape predefined by the outer border.

Figure 3:
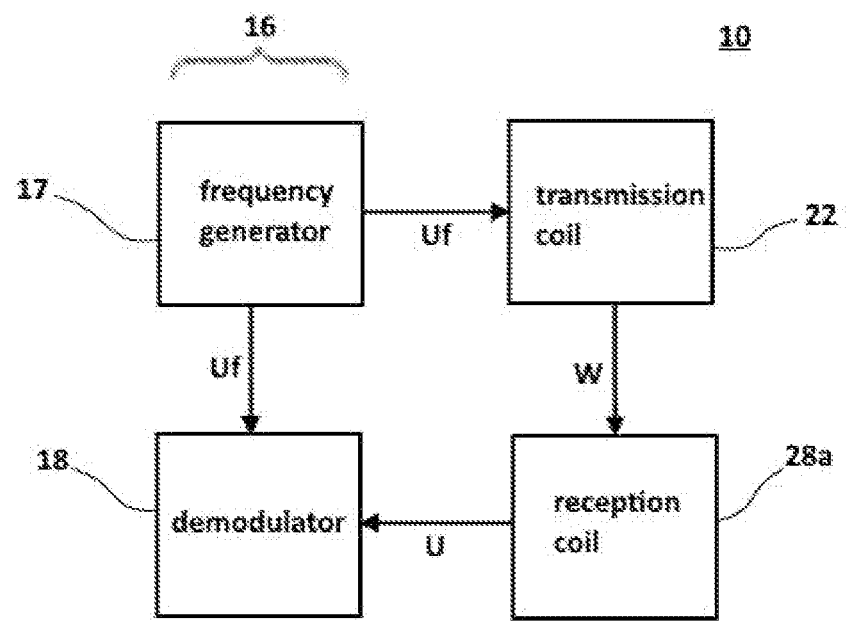

FIG. 3 schematically shows a view of part of the rotation angle sensor 10 and part of a measurement device 16 according to the first embodiment. FIG. 3 illustrates a first reception coil 28a of the at least two reception coils 28a, 28b as an example. A corresponding arrangement may be provided for a second reception coil 28b or each further reception coil of the at least two reception coils 28a, 28b.

The measurement device 16 is designed to detect the rotation angle depending on the inductive coupling between the rotor element 14 and the stator element 12. The measurement device 16 is designed to excite the transmission coil 22 at at least two different frequencies in order to emit at least two electromagnetic alternating fields. The measurement device 16 is additionally designed to demodulate at least two AC voltages induced in at least one of the at least two reception coils 28a, 28b by emitting the at least two electromagnetic alternating fields in order to detect at least two inductive couplings by way of respective frequencies of the at least two electromagnetic alternating fields. That is to say, an induced AC voltage U is demodulated by way of the frequency at which the electromagnetic alternating field W that induces the voltage is excited.

The measurement device 16 comprises a frequency generator 17, in particular a digital frequency generator 17, that is designed to predefine a multiplicity of in particular constantly changing frequencies f. By virtue of an AC voltage Uf output by the frequency generator 17 at the frequency f, the transmission coil 22 is excited in order to emit electromagnetic alternating fields W of different frequency f.

The measurement device 16 additionally comprises a demodulator 18 that is designed to demodulate the AC voltages U, induced by way of the electromagnetic alternating fields W of different frequency f, by way of the respectively predefined frequency f.

Both the induced AC voltage U and the AC voltage Uf are applied at the input of a demodulator 18. There may be provision for the induced AC voltage U to be boosted by a signal booster upstream of or in the demodulator 18. A mixer (not illustrated) is arranged for example in the demodulator 18 and mixes the AC voltage Uf and the induced AC voltage U. In this and the further embodiments, a mixer is the name given to a component that is normally used in communication technology for the frequency conversion of electrical signals. This component may be formed, as is known, from electronic components such as diodes and transistors. In digital signal processing, the mixer may also be replicated by software in a signal processor. The mixed signal is fed for example through a low-pass filter to a signal detection unit, for example to an analog-to-digital converter. This means that the AC voltage Uf and the induced AC voltage U are mixed in baseband. The useful signal is thereby separated from the carrier signal. The resultant signal in baseband is then filtered through the low-pass filter and then detected.

The rotation angle is able to be determined by evaluating the detected signals from the magnitude and phase of the inductive coupling. Details on the determination of the rotation angle are known for example from EP 0 909 955 B1.

Figure 4:
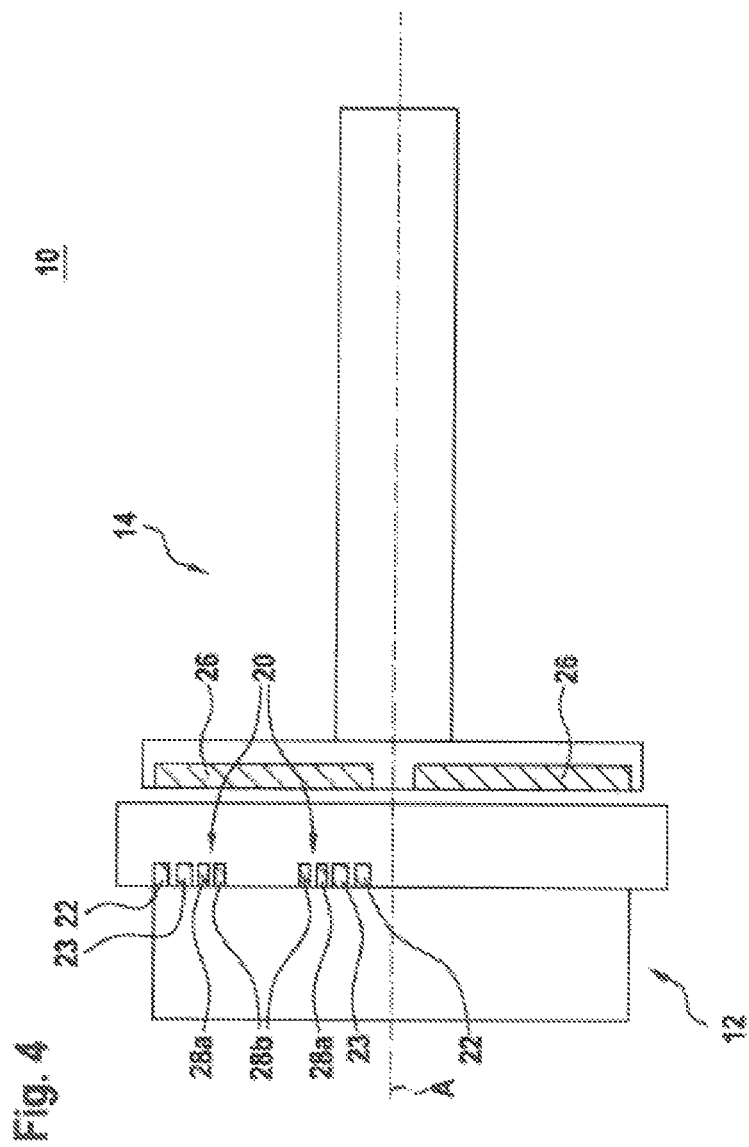

FIG. 4 schematically shows a view of part of a rotation angle sensor 10 according to a second embodiment, in a side view. Elements in this embodiment that match those described above are denoted using the same reference signs.

The rotation angle sensor 10 according to the second embodiment comprises a first transmission coil 22, a second transmission coil 23, and at least two reception coils 28a, 28b. The first transmission coil 22 and the second transmission coil 23 are arranged in a plane perpendicular to the axis of rotation A, in the radial direction with respect to the axis of rotation A, for example in the same plane of the circuit board, in the example. The transmission coils 22, 23 are arranged outside the respective reception coils 28a, 28b as seen in the radial direction with respect to the axis of rotation A.

Figure 5:
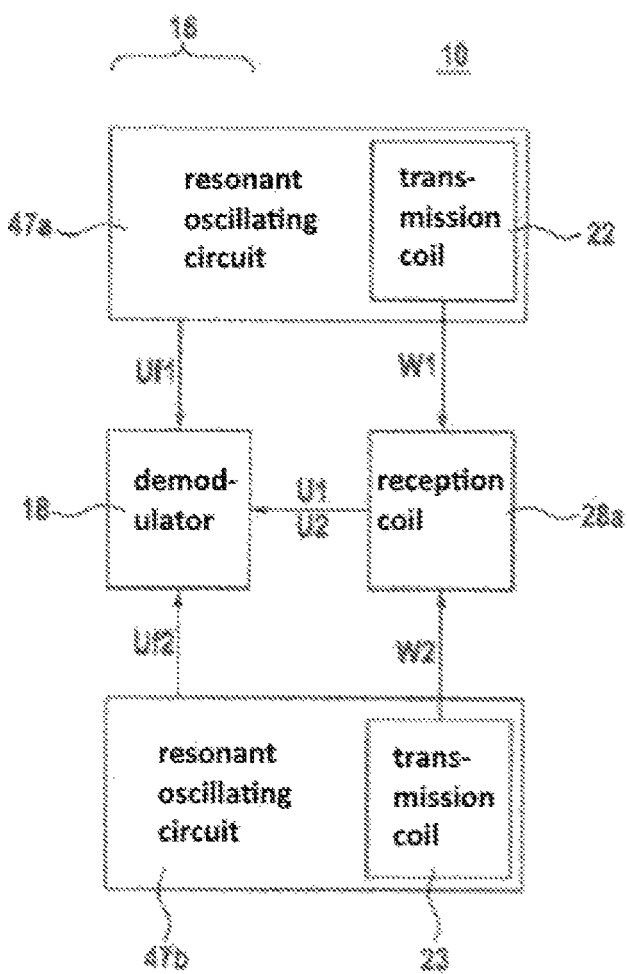

FIG. 5 schematically shows a view of part of the rotation angle sensor 10 and part of a measurement device 16 according to the second embodiment. Elements in this embodiment that match those described above are denoted using the same reference signs. FIG. 5 illustrates a first reception coil 28a of the at least two reception coils 28a, 28b as an example. A corresponding arrangement may be provided for a second reception coil 28b or each further reception coil of the at least two reception coils 28a, 28b.

The measurement device 16 comprises a first resonant oscillating circuit 47a that is designed to generate a first electromagnetic alternating field W1 at a first frequency f1 at a first time. The measurement device 16 comprises a second resonant oscillating circuit 47b that is designed to generate a second electromagnetic alternating field W2 at a second frequency f2 at a second time different from the first time.

The first transmission coil 22 is driven by the first resonant oscillating circuit 47a with a first AC voltage Uf1 and emits the first electromagnetic alternating field W1. The second transmission coil 23 is driven by the second resonant oscillating circuit 47b with a second AC voltage Uf2 and emits the second electromagnetic alternating field W2.

The frequencies of the first electromagnetic alternating field W1 and second electromagnetic alternating field W2 differ, in particular by at least 5%.

The demodulator 18, unlike in the first embodiment, is designed to demodulate the first induced AC voltage U1 generated in at least one of the at least two first reception coils 28a, 28b by way of the first frequency f1 and to demodulate the second induced AC voltage U2 generated in at least one of the at least two first reception coils 28a, 28b by way of the second frequency f2.

To this end, for example, the first resonant oscillating circuit 47a and the second resonant oscillating circuit 47b are connected on the output side to two different inputs of a mixer (not illustrated) in the demodulator 18.

The input of the mixer for the induced voltage remains unchanged in comparison with the first embodiment. The mixer arranged in the demodulator 18 mixes either the first AC voltage Uf1 with the first induced AC voltage U1 or the second AC voltage Uf2 with the second induced AC voltage U2. The demodulator 18 receives the first induced AC voltage U1 or the second induced AC voltage U2 in the same input.

Due to a temporal offset in the output AC voltages, depending on the time, the first AC voltage Uf1 and the first induced AC voltage U1 or the second AC voltage Uf2 and the second induced AC voltage U2 are applied to the mixer, for example. The measurement device 16 comprises a clock, for example, which is designed to drive the resonant oscillating circuits 47a, 47b in a temporally offset manner.

The other steps of the signal processing operation are performed as described in the first embodiment. The induced voltages are therefore able to be evaluated one after another.

Figure 6:
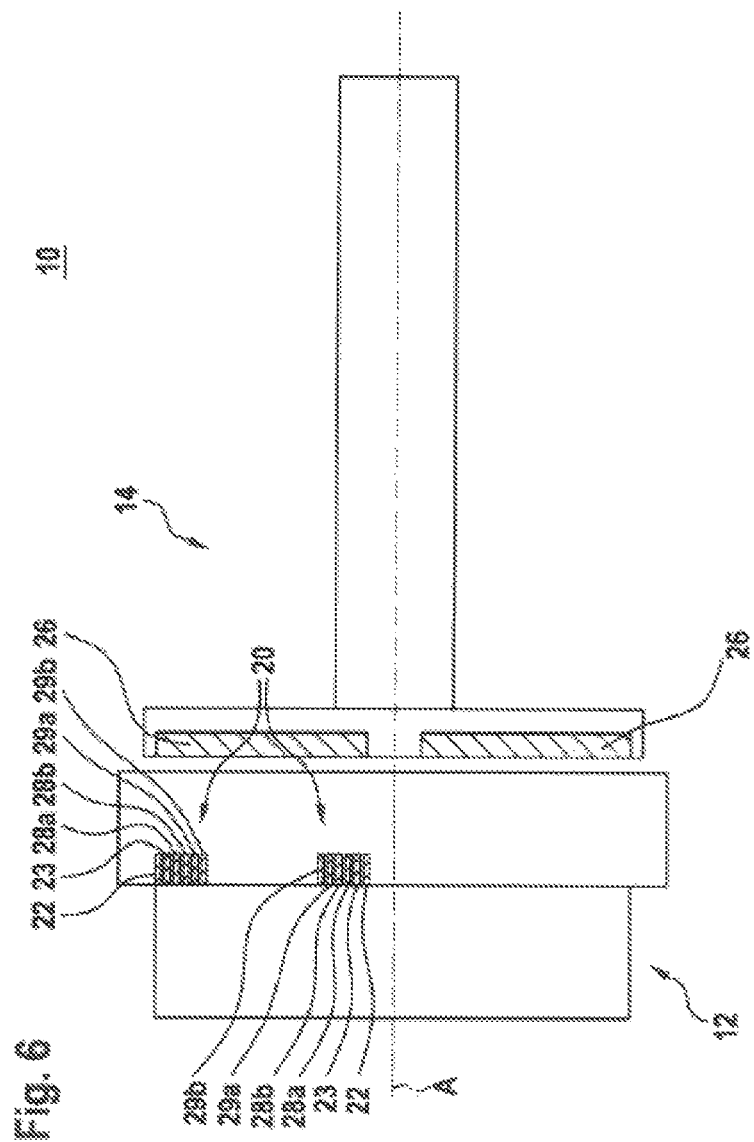

FIG. 6 schematically shows a view of part of a rotation angle sensor according to a third embodiment, in a side view. Elements in this embodiment that match those described above are denoted using the same reference signs.

The stator element 12 has at least two first reception coils 28a, 28b and at least two second reception coils 29a, 29b. The at least two first reception coils 28a, 28b are designed to detect a first induced AC voltage U1 at the first frequency f1 of the first electromagnetic alternating field W1. The at least two second reception coils 29a, 29b are designed to detect the second induced AC voltage U2 at the second frequency f2 of the second electromagnetic alternating field W2. The at least two first reception coils 28a, 28b and the at least two second reception coils 29a, 29b are arranged in a plane perpendicular to the axis of rotation A, in the radial direction with respect to the axis of rotation A, for example in the same plane or different planes of the circuit board, in the example. The transmission coils 22, 23 are arranged outside the respective reception coils 28a, 28b, 29a, 29b as seen in the radial direction with respect to the axis of rotation A. In this connection, designed means, for all embodiments, that the respective coil is optimized for the respective reception frequency. In addition to the actual desired inductance, real coils also have other, generally unwanted electrical properties, such as an electrical resistance, stray capacitances and therefore a resonant circuit having at least one electrical resonance point (natural resonance). By way of example, a suitable coil has a natural resonance of at least four times the reception frequency. This avoids unwanted effects caused by natural resonance.

Figure 7:
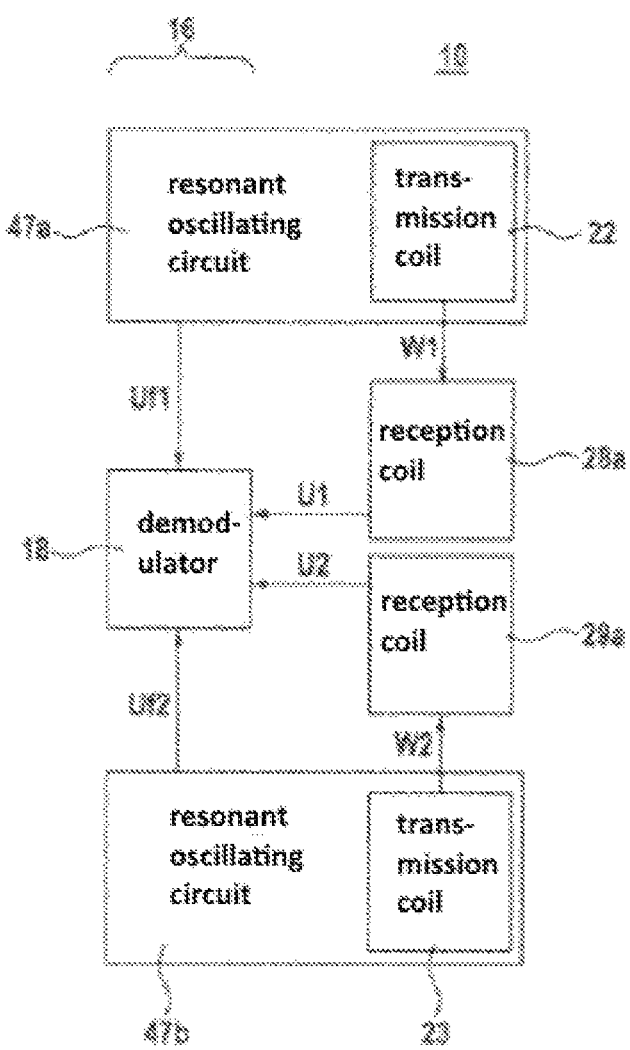

FIG. 7 schematically shows a view of part of the rotation angle sensor and part of a measurement device according to the third embodiment. Elements in this embodiment that match those described above are denoted using the same reference signs. FIG. 7 illustrates a first reception coil 28a of the at least two first reception coils 28a, 28b as an example. A corresponding arrangement may be provided for a second reception coil 28b of the at least two first reception coils 28a, 28b or each further reception coil of the at least two first reception coils 28a, 28b. FIG. 7 illustrates a first reception coil 29a of the at least two second reception coils 29a, 29b as an example. A corresponding arrangement may be provided for a second reception coil 29b of the at least two second reception coils 29a, 29b or each further reception coil of the at least two second reception coils 29a, 29b.

The measurement device 16 comprises, as described in the second embodiment, the first resonant oscillating circuit 47a and the second resonant oscillating circuit 47b.

The measurement device 16 comprises the demodulator 18, which, unlike in the embodiments described above, is designed with a first input for the first induced AC voltage U1 and a second input for the second induced AC voltage U2.

The demodulator 18 is designed to demodulate the first induced AC voltage U1 by way of the first frequency f1 and to demodulate the second induced AC voltage U2 by way of the second frequency f2.

By way of example, the demodulator 18 has two mixers (not illustrated). A first mixer processes the first AC voltage Uf1 with the first induced AC voltage U1, as described in the first embodiment. A second mixer processes the second AC voltage Uf2 with the second induced AC voltage U2, as described in the first embodiment.

The other steps of the signal processing operation are performed for each of the mixers, for example as described in the first embodiment.

This means that the demodulator 18 is designed to demodulate the first induced AC voltage U1 as input signal of at least one of the at least two first reception coils 28a, 28b at the first frequency f1 and to demodulate the second induced AC voltage U2 as input signal of at least one of the at least two second reception coils 29a, 29b at the second frequency f2.

Figure 8:
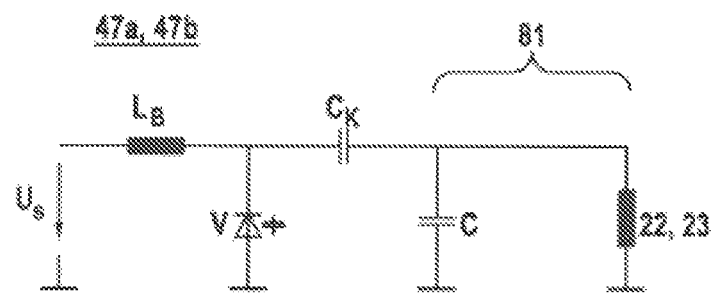

FIG. 8 schematically shows a view of part of an exemplary resonant oscillating circuit 47a, 47b. Elements in this embodiment that match those described above are denoted using the same reference signs.

The resonant oscillating circuit 47a, 47b comprises at least one varactor V that is connected in parallel with the at least one transmission coil 22, 23. A control voltage Us is applied to the varactor V via a decoupling inductor LB. These are both connected to an LC resonant circuit 81 via a coupling capacitor CK. Said LC resonant circuit consists of the capacitor C and the respective transmission coil 22, 23.

A respective frequency f is able to be tuned by the varactor V in this arrangement. A frequency variation of around 200 kHz to 1 MHz is possible using the varactor.

The described structure uses frequency generators or resonant oscillating circuits. Other clocks, such as RC oscillators or quartz oscillators, may likewise be used to drive or predefine the frequency. It is also possible to vary the frequency by changing component values other than the influence of the varactor. In the case of RC oscillators, the current or resistance may be influenced by a settable current source.

A digital frequency generator may be provided that varies the frequency by way of digital frequency synthesis.

In this case, the quartz oscillator or the RC oscillator may be used as a clock. The respective frequency f is generated by the digital frequency generator by way of a settable oscillator. The output signal of the settable oscillator is generated by reducing a main frequency, predefined by the clock, using a digital frequency divider. The output signal is compared with the main frequency by way of a phase comparator. A phase error that possibly occurs here is used to control the settable oscillator. By virtue of this feedback, virtually any desired frequency with the precision of the clock source is generated. It is likewise possible to directly use a settable oscillator if its generally poor frequency stability is sufficient for the application case.

In the described resonant oscillating circuits 47a, 47b, the transmission coil 22, 23 is also used as an element that determines frequency. As a result, interfering influences that change the frequency are already compensated intrinsically in the first instance.

The invention claimed is:

1. A rotation angle sensor, comprising:
   a stator element;
   a rotor element configured to rotate about an axis of rotation with respect to the stator element and defining a rotation angle; and
   a measurement device configured to detect the rotation angle depending on the inductive coupling between the rotor element and the stator element,
   wherein the stator element has at least one transmission coil configured to emit electromagnetic alternating fields and at least two reception coils configured to detect electromagnetic alternating fields,
   wherein the measurement device is configured to excite the at least one transmission coil at at least two different frequencies in order to emit at least two electromagnetic alternating fields,
   wherein the measurement device is configured to demodulate at least two AC voltages induced in at least one of the at least two reception coils by the at least two electromagnetic alternating fields in order to detect at least two inductive couplings between the rotor element and the stator element with reference to the at least two different frequencies of the respective at least two electromagnetic alternating fields,
   wherein the at least one transmission coil includes a first transmission coil and a second transmission coil,
   wherein the first transmission coil emits a first electromagnetic alternating field having a first frequency,
   wherein the second transmission coil emits a second electromagnetic alternating field having a second frequency that differs from the first frequency,
   wherein the at least two reception coils include at least two first reception coils and at least two second reception coils,
   wherein the at least two first reception coils are configured to detect a first induced AC voltage at the first frequency of the first electromagnetic alternating field, and
   wherein the at least two second reception coils are configured to detect a second induced AC voltage at the second frequency of the second electromagnetic alternating field.

2. The rotation angle sensor as claimed in claim 1, wherein:
   the measurement device comprises a frequency generator configured to predefine a multiplicity of constantly changing frequencies for the emission of electromagnetic alternating fields of different frequency by the at least one transmission coil, and
   the measurement device comprises a demodulator configured to demodulate the AC voltages, induced by way of the electromagnetic alternating fields of different frequency.

3. The rotation angle sensor as claimed in claim 1, wherein:
   the measurement device comprises a first resonant oscillating circuit configured to generate the first electromagnetic alternating field at a first frequency at a first time, and
   the measurement device comprises a second resonant oscillating circuit configured to generate the second electromagnetic alternating field at a second frequency at a second time different from the first time.

4. The rotation angle sensor as claimed in claim 3, wherein the measurement device comprises a demodulator configured to demodulate the first induced AC voltage with reference to the first frequency and to demodulate the second induced AC voltage with reference to the second frequency.

5. The rotation angle sensor as claimed in claim 4, wherein the demodulator is configured to demodulate the first induced AC voltage as input signal of at least one of the at least two first reception coils at the first frequency and to demodulate the second induced AC voltage as input signal of at least one of the at least two second reception coils at the second frequency.

6. The rotation angle sensor as claimed in claim 1, further comprising:
   at least one resonant oscillating circuit configured to generate signals at different frequencies and including the at least one transmission coil.

7. The rotation angle sensor as claimed in claim 6, wherein:
   the resonant oscillating circuit comprises at least one varactor connected in parallel with the at least one transmission coil, and
   the varactor is configured to tune a respective frequency.

8. The rotation angle sensor as claimed in claim 1, wherein a multiplicity of frequencies are predefined in the range of 4 MHz to 6 MHz.

9. A stator element for an inductive rotation angle sensor, the stator element comprising:
- a measurement device;
- at least one transmission coil configured to emit at least one electromagnetic alternating field;
- at least two reception coils configured to detect electromagnetic alternating fields;
- wherein the measurement device is configured to excite the at least one transmission coil with at least two electromagnetic alternating fields that differ in terms of frequency, and
- wherein the measurement device is configured to demodulate at least two AC voltages induced in at least one of the at least two reception coils by the at least two electromagnetic alternating fields in order to detect inductive couplings between the rotor element and the stator element of with reference to the at least two different frequencies of the respective at least two electromagnetic alternating fields,
- wherein the at least one transmission coil includes a first transmission coil and a second transmission coil,
- wherein the first transmission coil emits a first electromagnetic alternating field having a first frequency,
- wherein the second transmission coil emits a second electromagnetic alternating field having a second frequency that differs from the first frequency,
- wherein the at least two reception coils include at least two first reception coils associated with the first transmission coil and at least two second reception coils associated with the second transmission coil,
- wherein the at least two first reception coils are configured to detect a first induced AC voltage at the first frequency of the first electromagnetic alternating field, and
- wherein the at least two second reception coils are configured to detect a second induced AC voltage at the second frequency of the second electromagnetic alternating field.

* * * * *

UNITED STATES PATENT AND TRADEMARK OFFICE
CERTIFICATE OF CORRECTION

| | | |
|---|---|---|
| PATENT NO. | : 10,955,262 B2 | Page 1 of 1 |
| APPLICATION NO. | : 16/331694 | |
| DATED | : March 23, 2021 | |
| INVENTOR(S) | : Utermoehlen et al. | |

It is certified that error appears in the above-identified patent and that said Letters Patent is hereby corrected as shown below:

In the Claims

In Claim 9, Column 11, Line 18: "stator element of with reference" should read --stator element with reference--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*